May 3, 1955
E. W. EBY
2,707,782
HOLDER FOR DENTAL FLOSS
Filed June 22, 1951
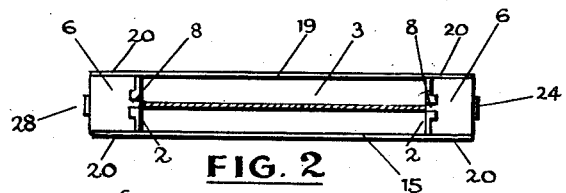
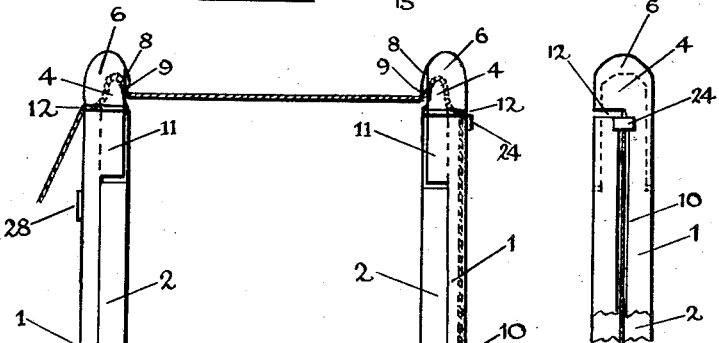
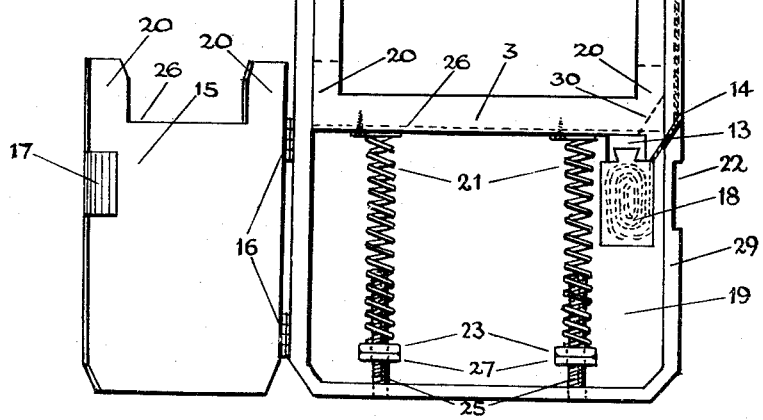
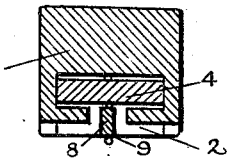
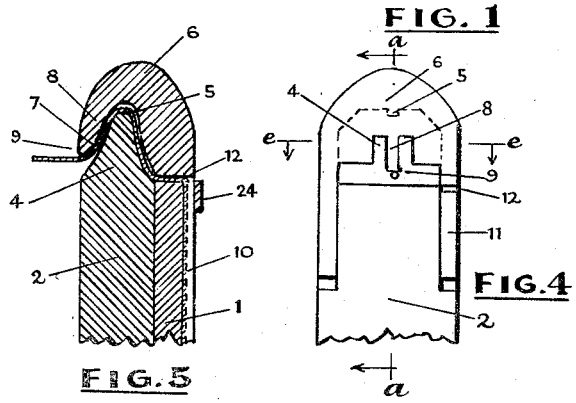
*INVENTOR*
*Eldon W. Eby*

United States Patent Office 2,707,782
Patented May 3, 1955

2,707,782

HOLDER FOR DENTAL FLOSS

Eldon W. Eby, Toronto, Ontario, Canada

Application June 22, 1951, Serial No. 232,917

5 Claims. (Cl. 132—92)

These improvements provide means to relieve tension of the floss or tape in the gap between the holding members of a dental floss holder. They provide a measured slack of floss in the gap and thus minimize the possibility of the floss being passed over contacting points of teeth with a snap injurious to the gum. They also provide a graduated and automatic slackening of the floss as it is drawn across the contacting points of teeth of varying tightness and at the same time has a positive grip which limits said slackening. These means are designed to operate smoothly in application of floss and in reverse, the removal of floss from between teeth.

The improved holder is shown in the accompanying drawings in which—

Fig. 1 is a side elevation with hinged receptacle casing open;

Fig. 2 is a plan view from top;

Fig. 3 is an end elevation of top of right hand floss feeding set of arms;

Fig. 4 is a view from floss gap of top of right hand floss feeding set of arms, enlarged;

Fig. 5 is a longitudinal section of Fig. 4 along line line a—a;

Fig. 6 is a cross section of Fig. 4 along line e—e.

In the drawings like numerals of reference indicate corresponding parts in the different figures.

The floss holder includes an outer part consisting of receptacle frame 29, Fig. 1, from which extend spaced arms 1—1. Arms 2—2 joined by crosspiece 3 are mounted to slide longitudinally along 1—1 and engage the outer ends of these arms to form two sets of arms with a clamp on end of each set and a gap between clamps. Floss from magazine 18 on spring retainer 13 is placed in open cut 14 and casing 15 hinged at 16 is closed as spring clasp 17 connects with recess 22, on receptacle frame. The receptacle is formed by the above mentioned frame and hinged casing and fixed rear casing 19. Projections 20 on hinged and rear casings are guides for sliding arms 2—2. Coil springs 21 attached to crosspiece 3 and fitted over threaded studs 25 on base of receptacle exert pressure on clamps. Nuts 23 regulate the pressure and nuts 27 are lock nuts.

Ends of arms 2—2 are wedge shaped and flat laterally at clamping parts 4 and have aligning notches 5 at their centres, Figs. 4 and 5. Ends of arms 1—1 are enlarged inwardly to over hang the ends of the arms 2—2 and are recessed to form caps 6 to receive wedges 4 and with said wedges providing opposed clamps. The interior walls of the caps 6 serve as guides and guards for the wedge shaped arms 4 and also as a floss check. On the inner section of each clamp are two longitudinal release cuts lateral to floss aligning plane, leaving a laterally narrow clamping part 8, Figs. 1, 2, 4, 5 and 6, hereinafter more fully described. At the base of each cap 6 on arms 1—1 are transverse aligning grooves 12. Groove 10 joins open cut 14 and transverse groove 12 of right hand floss feeding set of arms. Clip 24 retains floss at junction of grooves 12 and 10. Flanges 11 on arms 1—1 are guides for arm 2—2.

To thread holder floss from open cut 14 is carried along groove 10 and under clip 24. Down pressure on inner arm crosspiece 3 to floss changing level 26 at top of receptacle casing retracts wedges 4 below aligning grooves 12. Floss is now placed in both aligning grooves which puts it in same plane as notches 5 on wedges 4, down pressure is released allowing floss to clamp by spring pressure. When changing floss, crosspiece is depressed to floss changing level, floss raised from left hand aligning groove, fresh floss drawn across, replaced in aligning groove and alllowed to clamp. Cutter 28 is provided for severing the soiled length of floss. Groove 30 Fig. 1 across lower corner of inner frame gives clearance for floss when arms 2—2 are retracted. When hinged casing 15 is open inner arms 2—2 may be separated from outer arms 1—1 by depressing crosspiece 3 below level 26 far enough to clear arms 2—2 from guides 11.

Narrow clamping parts 8 which may be termed floss diverting members, bear floss on their flat bearing surfaces during clamping action. Clamping parts 8 as shown in Fig 5 hold floss firmly at their bases but the floss is given gradual relief as shown at 7 due to the gradual outward taper of the inner surfaces of said parts Fig. 5 and on the ends of each said narrow clamp there is a free trigger projection 9 where there is no clamping pressure.

The floss holder is used in mouth with side as in Fig. 1 in a flat lying position. The floss clamped as described previously is held taut across the gap being positively gripped in the outer section of clamps, temporarily gripped in the narrow parts of section of clamp and stretched over the free projections 9 extending past closed outlets of temporary clamps. Lateral pressure on floss as it is applied between teeth or finger pressure before application displaces floss from one (or both according to desire) of the narrow flattened free projections 9 and then narrow flattened clamp or clamps 8 and gives a slack to floss in gap.

The play necessary for initial displacement is slight and is supplied by the inward spring of the holding members. Displacement from free projection does not necessarily supply sufficient slack of floss, the lateral movement in displacement requiring a length of floss, but more slack is supplied by the relieved part of narrow clamp and also by firmly gripping part at base. The pressure used by operator and the rebound of inward spring of holding members is compensated for by the slackening of floss.

While a simple high projection will give slack to floss in gap the compact structure as shown operates evenly in supplying slack floss and in the removal of floss from contacts of teeth when it is undesirable that the floss should work back over temporary bearing parts 9 and 8. This is prevented by the sharp angle of these parts to the line of floss across gap and the close fit of these parts to the opposing part of clamp 4.

With clamps as shown in Figs. 1, 4, 5 and 6 nuts 23 on threaded studs 25 are adjusted to allow proper lateral slipping in narrow clamp at 8 but no lineal slippage in positive outer part of clamp.

I claim:

1. A dental floss holder including a pair of floss gripping clamps spaced to provide a gap and adapted to hold a length of floss across said gap, each of said clamps including a receiving part and a movable part cooperating with the inner surface of said receiving part to clamp floss, means urging said movable parts to their clamping positions within said receiving parts respectively, a floss diverting member carried by one of said clamp parts within said gap, said floss diverting member intersecting the clamping plane of said clamps whereby the floss in the clamping process is diverted from a direct line between clamps around the end of said floss diverting member, so that the length of floss in said gap exceeds the direct distance between said clamps, and means for allowing the lateral displacement of said floss in respect to said floss diverting member to provide slack in said floss.

2. A dental floss holder according to claim 1, wherein said floss diverting member comprises a laterally narrow projection from one of said receiving clamp parts extending across a direct line between said clamps and terminating in an end part adapted to be engaged by the floss.

3. A dental floss holder according to claim 1, wherein the said floss diverting member has an interior surface part adapted to cooperate with the associated movable clamp part to clamp floss.

4. A dental floss holder including a pair of floss gripping clamps spaced to provide a gap and adapted to hold a length of floss across said gap, each of said clamps including a receiving part and a movable part cooperating with the inner surface of said receiving part to clamp floss, means urging said movable parts to their clamping positions within said receiving parts respectively, floss diverting members carried by said receiving clamp parts within said gap intersecting the direct course of said floss between said clamps whereby the floss in the clamping process is diverted from a direct course between said clamps around the ends of said floss diverting members so that the length of floss in said gap exceeds the direct distance between said clamps, means allowing lateral displacement of said floss in respect to said floss diverting members to provide slack in said floss, said floss diverting members having interior surface parts paralleling said movable clamp parts from their inner ends to points intermediate of their length cooperating with said movable clamp parts to clamp floss and from said intermediate points receding from said clamp parts.

5. A dental floss holder comprising a pair of spring-pressed arms spaced to provide a gap and a pair of fixed arms having recessed cap portions receiving the ends of said spring-pressed arms and cooperating therewith to clamp floss at opposite sides of said gap, adjustable means urging said spring-pressed arms to their clamping positions within said recessed cap portions, said cap portions having opposed projections within the gap, said projections having inner surface portions paralleling for portions of their lengths said spring-pressed arms and cooperating therewith to clamp floss and thereafter to their outer ends receding from said spring-pressed arms, the said projections extending across the clamping plane of said clamps whereby in the clamping process the course of the floss will be over the ends of said projections, and relief openings in the ends of said projections receiving the floss upon lateral displacement thereof from the ends of said projections and thereby providing slack in the floss.

References Cited in the file of this patent

UNITED STATES PATENTS

| | | |
|---|---|---|
| 1,039,591 | Prideaux | Sept. 24, 1912 |
| 1,445,009 | Eby | Feb. 13, 1923 |